(12) United States Patent
Kamat et al.

(10) Patent No.: US 11,229,012 B2
(45) Date of Patent: Jan. 18, 2022

(54) DYNAMIC MODIFICATION OF DEVICE BAND AND RADIO ACCESS TECHNOLOGY INFORMATION

(71) Applicant: Verizon Patent and Licensing Inc., Arlington, VA (US)

(72) Inventors: Sachin Kamat, East Brunswick, NJ (US); Jeremy Nacer, Boca Raton, FL (US); Sudhir Patel, Boonton, NJ (US)

(73) Assignee: Verzon Patent and Licensing Inc., Basking Ridge, NJ (US)

( * ) Notice: Subject to any disclaimer, the term of this patent is extended or adjusted under 35 U.S.C. 154(b) by 43 days.

(21) Appl. No.: 16/686,850

(22) Filed: Nov. 18, 2019

(65) Prior Publication Data
US 2021/0153166 A1   May 20, 2021

(51) Int. Cl.
*H04W 4/00* (2018.01)
*G08C 15/00* (2006.01)
*H04W 72/02* (2009.01)
*H04W 48/14* (2009.01)
*H04W 8/18* (2009.01)
*H04W 4/70* (2018.01)

(52) U.S. Cl.
CPC .......... *H04W 72/02* (2013.01); *H04W 4/70* (2018.02); *H04W 8/183* (2013.01); *H04W 48/14* (2013.01)

(58) Field of Classification Search
CPC ....... H04W 72/02; H04W 4/70; H04W 48/14; H04W 8/183
USPC ........................................................ 370/379
See application file for complete search history.

(56) References Cited

U.S. PATENT DOCUMENTS

| | | | | | |
|---|---|---|---|---|---|
| 5,276,907 | A | * | 1/1994 | Meidan | H04W 16/04 455/436 |
| 5,748,624 | A | * | 5/1998 | Kondo | H04J 3/1694 370/347 |
| 6,983,148 | B1 | * | 1/2006 | Kirla | H04W 36/12 455/436 |
| 8,837,401 | B2 | * | 9/2014 | Immonen | H04B 1/525 370/329 |
| 8,897,777 | B2 | * | 11/2014 | Choi | H04W 36/00835 455/436 |
| 2002/0082018 | A1 | * | 6/2002 | Coskun | H04W 36/0055 455/439 |
| 2003/0148764 | A1 | * | 8/2003 | Kelley | H04W 8/22 455/434 |
| 2004/0087305 | A1 | * | 5/2004 | Jiang | H04W 48/18 455/432.1 |
| 2005/0221824 | A1 | * | 10/2005 | Lee | H04W 36/0066 455/435.2 |
| 2008/0039086 | A1 | * | 2/2008 | Gallagher | H04W 12/08 455/435.1 |
| 2008/0123595 | A1 | * | 5/2008 | Lindheimer | H04W 52/40 370/331 |

(Continued)

*Primary Examiner* — Mark G. Pannell (57) ABSTRACT

A device may send a first message to a user device requesting information identifying a radio access technology (RAT) or a band supported by and enabled on the user device. The device may receive an indication of the RAT or band supported by and enabled on the user device and send, to the user device, a second message instructing the user device to modify the RAT or band enabled on the user device. The second message may include an indication of updated RAT or band information. The device may receive from the user device, a confirmation that the RAT or band enabled on the user device has been modified.

20 Claims, 7 Drawing Sheets

(56) References Cited

U.S. PATENT DOCUMENTS

| | | | |
|---|---|---|---|
| 2008/0212509 A1* | 9/2008 | Kim | H04W 72/005 370/312 |
| 2009/0075652 A1* | 3/2009 | Jung | H04W 48/16 455/434 |
| 2009/0116441 A1* | 5/2009 | Park | H04W 48/18 370/329 |
| 2009/0257387 A1* | 10/2009 | Gholmieh | H04W 28/16 370/329 |
| 2009/0325608 A1* | 12/2009 | Cheng | H04W 68/12 455/458 |
| 2010/0103829 A1* | 4/2010 | Murzeau | H04W 60/04 370/252 |
| 2010/0234029 A1* | 9/2010 | Ishii | H04W 36/14 455/437 |
| 2011/0032911 A1* | 2/2011 | Choi | H04W 48/18 370/335 |
| 2011/0122801 A1* | 5/2011 | Franklin | H04W 8/245 370/280 |
| 2011/0149768 A1* | 6/2011 | Kang | H04W 72/082 370/252 |
| 2011/0171989 A1* | 7/2011 | Kim | H04L 5/0055 455/522 |
| 2011/0189945 A1* | 8/2011 | Fukuzawa | H04W 48/20 455/7 |
| 2011/0235581 A1* | 9/2011 | Diachina | H04W 48/02 370/328 |
| 2011/0256855 A1* | 10/2011 | Wang | H04W 8/24 455/418 |
| 2011/0310844 A1* | 12/2011 | Rexhepi | H04W 60/02 370/331 |
| 2012/0008581 A1* | 1/2012 | Kojima | H04W 52/0225 370/329 |
| 2012/0051286 A1* | 3/2012 | Yang | H04W 24/08 370/328 |
| 2012/0233627 A1* | 9/2012 | Yu | G06F 11/0742 719/313 |
| 2013/0012216 A1* | 1/2013 | Chen | H04W 76/12 455/450 |
| 2013/0058310 A1* | 3/2013 | Park | H04W 72/082 370/331 |
| 2013/0065600 A1* | 3/2013 | Lim | H04W 36/0066 455/450 |
| 2013/0188543 A1* | 7/2013 | Dwyer | H04W 76/27 370/311 |
| 2013/0201918 A1* | 8/2013 | Hirakawa | H04W 36/06 370/328 |
| 2014/0161113 A1* | 6/2014 | Cui | H04W 12/50 370/338 |
| 2014/0293818 A1* | 10/2014 | Sesia | H04W 24/08 370/252 |
| 2014/0293949 A1* | 10/2014 | Kim | H04W 16/14 370/329 |
| 2014/0357268 A1* | 12/2014 | Dubey | H04W 48/16 455/434 |
| 2015/0036517 A1* | 2/2015 | Ruutu | H04W 24/10 370/252 |
| 2015/0099516 A1* | 4/2015 | Nayak | H04W 8/183 455/435.3 |
| 2015/0148030 A1* | 5/2015 | Seo | H04L 5/001 455/426.1 |
| 2015/0173017 A1* | 6/2015 | Rakotoharison | H04W 52/0222 370/311 |
| 2016/0007247 A1* | 1/2016 | Lee | H04W 36/0072 370/331 |
| 2016/0072896 A1* | 3/2016 | Petersen | H04W 4/021 709/227 |
| 2016/0081022 A1* | 3/2016 | Haneji | H04W 76/28 370/311 |
| 2016/0112916 A1* | 4/2016 | Kim | H04W 64/00 455/436 |
| 2016/0165604 A1* | 6/2016 | Khawer | H04L 5/001 455/452.1 |
| 2017/0048336 A1* | 2/2017 | Novo Diaz | H04L 67/02 |
| 2017/0048828 A1* | 2/2017 | Um | H04L 1/1854 |
| 2017/0071021 A1* | 3/2017 | Jin | H04W 8/22 |
| 2017/0215023 A1* | 7/2017 | Ly | H04W 60/005 |
| 2017/0280376 A1* | 9/2017 | Nagahama | H04W 48/06 |
| 2017/0318023 A1* | 11/2017 | Seed | H04W 4/70 |
| 2018/0359149 A1* | 12/2018 | Shaheen | H04W 72/0453 |
| 2018/0376470 A1* | 12/2018 | Crawley | H04L 47/122 |
| 2019/0173880 A1* | 6/2019 | Nakhjiri | G06F 9/4416 |
| 2019/0239064 A1* | 8/2019 | Stojanovski | H04W 36/0022 |
| 2020/0077451 A1* | 3/2020 | You | H04W 74/0833 |
| 2020/0100090 A1* | 3/2020 | Baik | H04W 8/005 |
| 2021/0006603 A1* | 1/2021 | Park | H04L 1/00 |

* cited by examiner

| RAT NODES | |
|---|---|
| Total # of RATS supported | [number] |
| Total # of RATS enabled | [number] |
| RAT Type LTE | [enabled/disabled] |
| RAT Type LTE CAT-M | [enabled/disabled] |
| RAT Type LTE NB-IoT | [enabled/disabled] |
| RAT Type GSM | [enabled/disabled] |
| RAT Type 5G Sub-6 | [enabled/disabled] |
| RAT Type 5G-mmW | [enabled/disabled] |

320

| LTE BAND ENABLEMENT NODES | |
|---|---|
| Total # of LTE BANDS supported | [number] |
| Total # of LTE BANDS enabled | [number] |
| BAND # INFO | [enabled/disabled] |
| BAND # INFO | [enabled/disabled] |
| BAND # INFO | [enabled/disabled] |

330

| GSM BAND ENABLEMENT NODES | |
|---|---|
| Total # of GSM BANDS supported | [number] |
| Total # of GSM BANDS enabled | [number] |
| BAND # INFO | [enabled/disabled] |
| BAND # INFO | [enabled/disabled] |
| BAND # INFO | [enabled/disabled] |

340

| 5G BAND ENABLEMENT NODES | |
|---|---|
| Total # of 5G BANDS supported | [number] |
| Total # of 5G BANDS enabled | [number] |
| BAND # INFO | [enabled/disabled] |
| BAND # INFO | [enabled/disabled] |
| BAND # INFO | [enabled/disabled] |

| SIM FILE FOR RAT | |
|---|---|
| Total # of RATS supported | [number] |
| Total # of RATS enabled | [number] |
| RAT Type LTE | [enabled/disabled] |
| RAT Type LTE CAT-M | [enabled/disabled] |
| RAT Type LTE NB-IoT | [enabled/disabled] |
| RAT Type GSM | [enabled/disabled] |
| RAT Type 5G Sub-6 | [enabled/disabled] |
| RAT Type 5G-mmW | [enabled/disabled] |

410

| SIM FILE FOR GSM BAND ENABLEMENT | |
|---|---|
| Total # of GSM BANDS supported | [number] |
| Total # of GSM BANDS enabled | [number] |
| BAND # INFO | [enabled/disabled] |
| BAND # INFO | [enabled/disabled] |
| BAND # INFO | [enabled/disabled] |

430

| SIM FILE FOR LTE BAND ENABLEMENT | |
|---|---|
| Total # of LTE BANDS supported | [number] |
| Total # of LTE BANDS enabled | [number] |
| BAND # INFO | [enabled/disabled] |
| BAND # INFO | [enabled/disabled] |
| BAND # INFO | [enabled/disabled] |

420

| SIM FILE FOR 5G BAND ENABLEMENT | |
|---|---|
| Total # of 5G BANDS supported | [number] |
| Total # of 5G BANDS enabled | [number] |
| BAND # INFO | [enabled/disabled] |
| BAND # INFO | [enabled/disabled] |
| BAND # INFO | [enabled/disabled] |

DYNAMIC MODIFICATION OF DEVICE BAND AND RADIO ACCESS TECHNOLOGY INFORMATION

BACKGROUND

The "Internet of Things" (IoT) is a network of physical devices (i.e., "things") where the devices are designed for a specific function, unlike general computing devices such as a "smart" device, desktop or laptop computer. IoT devices are embedded with electronics and network connectivity that enables these objects or devices to collect, store and exchange data. IoT devices communicate and exchange data on frequency bands enabled for the IoT devices and using different radio access technologies (RATs). In some instances, it may be necessary to enable or disable different bands and/or RATs for IoT devices. Currently it is not easy to modify or personalize deployed IoT devices to allow the IoT devices to scan different bands or support various RATs.

DETAILED DESCRIPTION OF THE PREFERRED EMBODIMENTS

The following detailed description refers to the accompanying drawings. The same reference numbers in different drawings may identify the same or similar elements. The following detailed description does not limit the invention, which is defined by the claims.

Wireless access networks were traditionally designed to support mobile devices, such as smart phones. However, the increasing number of IoT applications have led to a growing number of IoT devices employing machine-to-machine (M2M) communication, such as Machine-Type Communication (MTC). An IoT device may be configured to communicate with other devices without requiring explicit user interaction. IoT devices may have a wide variety of uses, ranging from stationary uses such as utility meters, environmental sensors, parking meters and/or occupancy sensors, security sensors, smart lighting, traffic cameras, advertising displays, point-of-sale terminals, vending machines, remote diagnostics devices, power grid sensors and/or management devices, to mobile and high speed autonomous vehicles and aerial drones.

A wireless network, such as a Fourth Generation (4G) Long Term Evolution (LTE) access network (e.g., an evolved packet core (EPC) network), may use the Evolved Universal Terrestrial Radio Access (E-UTRA) air interface to wirelessly communicate with devices. The bandwidth of an E-UTRA channel in an LTE band may range from about 1.4 to about 20 Megahertz (MHz). In many applications, the amount of data sent or received by IoT devices may be small compared to other types of devices, such as mobile phones used for voice communication or for streaming content. Furthermore, many IoT devices are designed for low power applications and long battery life. Therefore, use of large bandwidth channels that use large amounts of power, such as an LTE channel, for wirelessly communicating with IoT devices may be an inefficient use of radio link resources.

A technology developed for IoT applications that does not require large amounts of data and that is based on a Low Power Wide Area Network (LPWAN) design is LTE Category M (CAT-M). CAT-M channels, also sometimes referred to as enhanced MTC (eMTC) channels, use a total bandwidth of about 1.4 MHz and have a very low power requirement compared to an LTE channel. Another technology developed for IoT applications that does not require large amounts of data or power, is the Narrow Band (NB) IoT (NB-IoT) technology. NB-IoT is an LPWAN technology that uses 200 Kilohertz (KHz) channels, with their own guard bands, for sending small amounts of data. The use of NB-IoT channels may result in better signal penetration in hard to reach areas, such as areas likely to be occupied by IoT devices (e.g., a utility meter installed in a location that shadows or fades wireless signals). Furthermore, the use of NB-IoT channels may result in lower energy consumption and/or cheaper component cost.

In addition to communicating with IoT devices via different RATs (e.g., CAT-M, NB-IoT, etc.), a wireless communications network may communicate with IoT devices via different frequency bands. An IoT device may support various RATs and frequency bands, but only particular RATs and frequency bands may be enabled on the IoT devices. In some situations, it may be advantageous to modify the IoT device to a frequency band or RAT used to communicate with an IoT device. In these situations, the IoT devices may need to be modified to enable and/or disable different RATs and/or frequency bands.

In one example, CAT-M IoT devices attached to the wireless communications network may initially have band 13 enabled for sending and receiving data. However, the wireless communications network may subsequently enable a different band on the network (e.g., band 4) for communicating with IoT devices. In this case, the wireless communications network may enable band 4 on the IoT devices, for example, by performing a software update via a firmware over-the-air (FOTA) update or through a device's Original Equipment Manufacturer's (OEM) application server. Performing the software or firmware update on thousands of IoT devices via an update may use significant network resources and may cause congestion and other issues on the network.

Some IoT devices may be built with multi-mode modules (i.e., modules that support CAT-M, NB-IoT, Global System for Mobile Communications (GSM), etc.) to support more than one RAT (e.g., CAT-M, NB-IoT, GSM, etc.). As an example, an IoT device may be enabled for one RAT (e.g., CAT-M) and support for additional RATs (e.g., NB-IoT, GSM, etc.) may be enabled or disabled on the IoT device. In this example, when the IoT device is deployed, there may be no easy mechanism for enabling or disabling different RATs on the IoT device.

As another example, in some instances, an OEM of an IoT device may have enabled two or more different RATs (e.g., CAT-M and NB-IoT) on the IoT device before deployment on a wireless communications network. In this example, the IoT device may be certified to connect to the CAT-M network and may connect to the CAT-M network. When the wireless communications network enables the NB-IoT network on a trial basis, the IoT device may also connect to the NB-IoT network even though the IoT device may not be certified for NB-IoT. In this scenario, the wireless communications network may not be able to disable the NB-IoT capability of the IoT device remotely before the IoT device attaches to the NB-IoT network and before the NB-IoT network is ready for public use.

As another example, an IoT device may initially support communications through the LTE network and/or a Fifth Generation (5G) network. As a wireless communications network completes the rollout of the 5G network, the wireless communications network may be ready to disable the LTE network and there may be no need for the IoT device to scan for LTE bands. It would be beneficial for the wireless communications network to be able to remotely disable the LTE bands on the IoT devices without performing a software update on thousands of devices.

In another example, an IoT device with LTE CAT-M and GSM capabilities may use GSM initially while roaming in another country (e.g., Canada). As the roaming network enables LTE CAT-M, the IoT device should continue to scan only for the GSM bands until the LTE CAT-M network is fully validated. In this example, it may be beneficial to disable specific LTE bands when the IoT device is in the roaming network. Additionally, once the CAT-M deployment is completed fully, it may be beneficial to remotely disable the IoT device's GSM bands and enable the IoT device's LTE CAT-M band.

Exemplary embodiments described herein enable a wireless communications network to personalize IoT device band scan preferences on LTE and 5G devices remotely and on the fly. Additionally, exemplary embodiments allow a wireless communications network to enable and/or disable RAT behavior on commercial IoT devices in the field and/or while roaming. Enabling and/or disabling RAT channels may allow the wireless communications network to ensure that IoT devices do not attempt to attach to a network/channel that is under deployment until the channel is commercially ready.

In addition, exemplary embodiments described herein may allow a wireless communications network to prevent rogue devices that have not been certified for certain network technology from using a specific type of network. For example, the wireless communications network may audit all devices that have been certified for certain RAT and band combinations and that are operating per that combination. If a device is operating using a RAT/band combination for which the device has not been certified, the wireless communications network may flag the device for violation and take corrective action. For example, the wireless communications network may remotely disable all bands on an unauthorized device. In this case, the unauthorized device may be forced to re-scan for bands, which may result in no new attach requests from the device. This security feature may be used for commercial deployment on the wireless communications network for disabling hacked or compromised devices from attaching to the wireless communications network.

Embodiments described herein may allow a wireless communications network to offer the ability to enable and/or disable particular bands and/or RATs on IoT devices to OEMs. For example, an OEM may be able to control RAT or band personalization based on device location or roaming location using a SIM over-the-air (OTA) server or a user interface platform. In addition, exemplary embodiments herein may allow an operator of a device to conserve device battery power by disabling unnecessary band or RAT scans.

Furthermore, embodiments described herein may allow a wireless communications network to disable certain bands or RATs on a temporary basis on many commercial devices. For example, if an issue is discovered when IoT devices attach to certain bands or RATs, the mobile communications operator may disable the certain bands or RATs. When the issue has been resolved, the wireless communications network may enable the certain bands or RATs for the devices.

Embodiments described herein may allow band and/or RAT preferences stored on an IoT device to be modified via a remote server. In one implementation, an Open Mobile Alliance (OMA) Device Management (DM) server or a Lightweight Machine-to-Machine (LWM2M) server may query a device for supported RAT and band information stored on the device's DM nodes (i.e., OMA DM or LWM2M nodes or modules). The OMA DM or LWM2M server may remotely update RAT and/or bands supported by the device using write requests in the user equipment (UE). In another implementation, a Subscriber Identity Module (SIM) OTA server may query a device for supported RAT and band information stored on a SIM file of the device's SIM card. The SIM OTA server may send updated RAT and/or band information to the device and information stored in the device's SIM files may be updated to enable and/or disable different RAT and/or band information. In both implementations, when the RAT and/or band information has been successfully updated, the device may begin using the updated RAT and/or band information for performing new scans.

Figure 1:
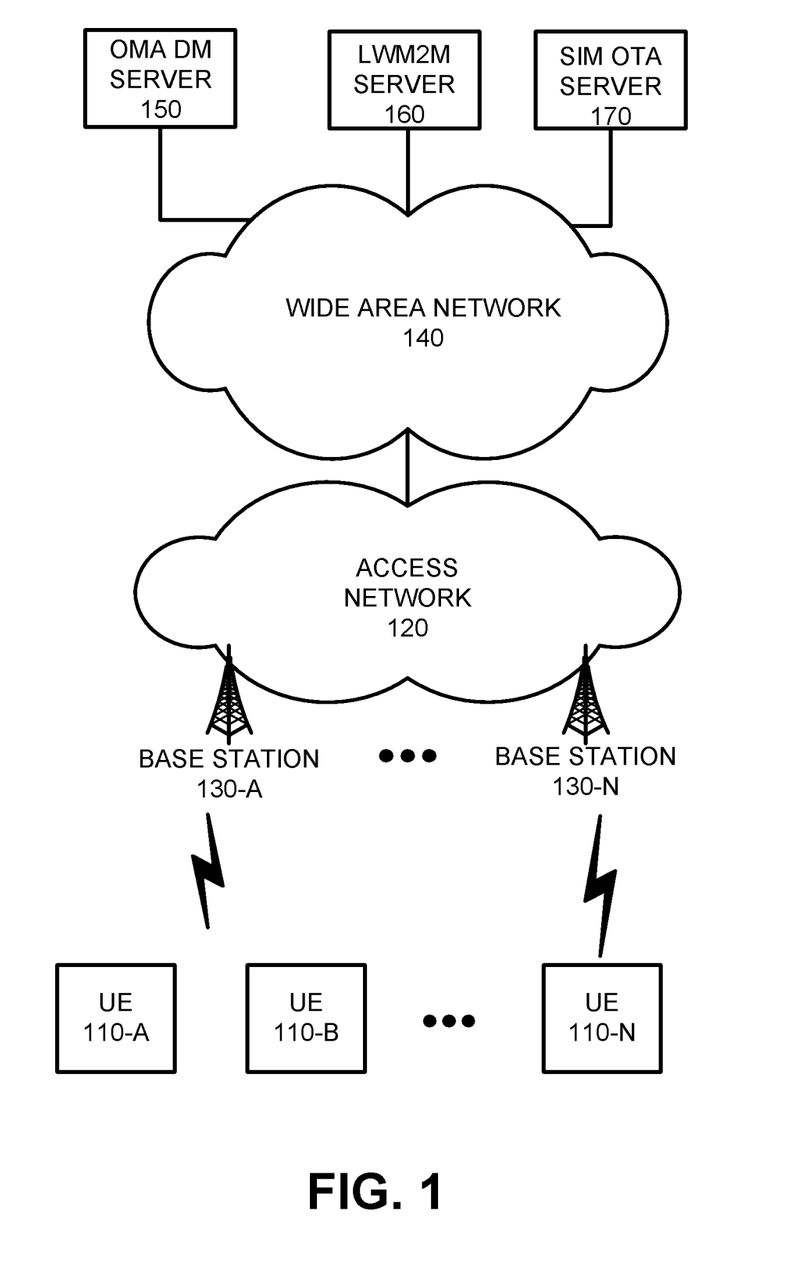
FIG. 1 is a diagram illustrating an exemplary network environment consistent with an embodiment.

FIG. 1 is a diagram illustrating an exemplary network environment 100 consistent with an embodiment. As shown in FIG. 1, environment 100 may include endpoint user equipment devices (UEs) 110-A to 110-N (referred to herein collectively as "UEs 110" and individually as "UE 110"), an access network 120, a wide area network (WAN) 140, an OMA DM server 150, a LWM2M server 160, and a SIM OTA server 170.

UEs 110 may include any device with (e.g., cellular or mobile wireless network) wireless communication functionality. For example, UEs 110 may communicate using M2M communication, such as MTC. For example, UE 110 may include a utility meter (e.g., electricity meter, water meter, gas meter, etc.), an asset tracking device (e.g., a system monitoring the geographic location of a fleet of vehicles, etc.), a personal tracking device (e.g., a system monitoring the geographic location of people, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), health monitoring device (e.g., a blood pressure monitoring device, a blood glucose monitoring device, etc.), and/or another type of electronic device with communication capabilities.

In other implementations, UE 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and/or a user interface.

UE 110 may include a smart card for storing information, data, or applications (apps) relevant to the operation of the corresponding UE 110, such as, for example, for performing authentication and application enabling with a wireless network (e.g., a public land mobile network (PLMN)). Each smart card may include, for example, a Universal Integrated Circuit Card (UICC), a removable user identity module (R-UIM), a SIM, a universal subscriber identity module (USIM), or an Internet Protocol (IP) multimedia services identity module (ISIM). SIM cards securely store an identifier or key used to identify a subscriber on wireless devices. SIM cards enable users to change devices by removing the SIM card from one device and inserting the SIM card into another device. UICCs are smart cards used in mobile terminals in Global System for Mobile Communications (GSM) and Universal Mobile Telecommunications System (UMTS) networks. UICCs ensure the integrity and security of different types of personal data, and may include several applications that permit access to both GSM and UMTS networks. R-UIMs include cards having features that are usable with Code Division Multiple Access (CDMA), GSM and UMTS networks. USIMs include smart cards having features that are usable with UMTS networks. ISIMs include smart cards having features that are usable with UMTS 3G or Internet Protocol Multimedia Subsystem (IMS) Long-Term Evolution (LTE) networks. In one embodiment, the smart card may be implemented as a software module in IoT device 105.

Access network 120 may provide access to WAN 140 for UEs 110. Access network 120 may enable UEs 110 to connect to WAN 140 for Internet Protocol (IP) services and/or non-IP data delivery (NIDD) services, mobile telephone service, Short Message Service (SMS), Multimedia Message Service (MMS), multimedia broadcast multicast service (MBMS), Internet access, cloud computing, and/or other types of data services.

Access network 120 may establish or may be incorporated into a packet data network connection between UE 110 and WAN 140 via one or more Access Point Names (APNs). For example, access network 120 may establish a non-IP connection between UE 110 and WAN 140. Furthermore, through an APN, access network 120 may enable UE 110 to communicate with OMA server 150, LWM2M server 160, and/or SIM OTA server 170 via WAN 140.

In some implementations, access network 120 may include an LTE access network (e.g., an evolved packet core (EPC) network). In other implementations, access network 120 may include a Code Division Multiple Access (CDMA) access network. For example, the CDMA access network may include a CDMA enhanced High Rate Packet Data (eHRPD) network (which may provide access to an LTE access network).

Furthermore, access network 120 may include an LTE Advanced (LTE-A) access network and/or a Fifth Generation (5G) access network or other next generation or advanced network that includes functionality such as 5G new radio (NR) base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide eMTC channels, Low Power Wide Area (LPWA) technology such as NB-IoT technology, and/or other types of MTC technology; and/or other types of LTE-A and/or 5G functionality.

As described herein, access network 120 may include base stations 130-A to 130-N (referred to herein collectively as "base stations 130" and individually as "base station 130"). Each base station 130 may service a set of UEs 110. For example, base station 130-A may service UEs 110-A and 110-B, and base station 130-N may service UE 110-N. Base station 130 may include a 5G base station (e.g., a next generation node B (gNodeB)) that includes one or more radio frequency (RF) transceivers (also referred to as "cells" and/or "base station sectors") facing particular directions. For example, base station 130 may include three RF transceivers and each RF transceiver may service a 120° sector of a 360° field of view. Each RF transceiver may include an antenna array. The antenna array may include an array of controllable antenna elements configured to send and receive 5G NR wireless signals via one or more antenna beams. The antenna elements may be digitally controllable to electronically tilt, or adjust the orientation of, an antenna beam in a vertical direction and/or horizontal direction. In some implementations, the antenna elements may additionally be controllable via mechanical steering using one or more motors associated with each antenna element. The antenna array may serve k UEs 110 and may simultaneously generate up to k antenna beams. A particular antenna beam may service multiple UEs 110. In some implementations, base station 130 may also include a 4G base station (e.g., an evolved NodeB (eNodeB)).

WAN 140 may include any type of wide area network, a metropolitan area network (MAN), an optical network, a video network, a satellite network, a wireless network (e.g., a CDMA network, a general packet radio service (GPRS) network, an LTE network, and/or a 5G network), an ad hoc network, a telephone network (e.g., the Public Switched Telephone Network (PSTN) or a cellular network), an intranet, or a combination of networks. Some or all of WAN 140 may be managed by a provider of communication services that also manages access network 120 and/or UEs 110. WAN 140 may allow the delivery of IP and/or non-IP services to/from UE 110, and may interface with other external networks. WAN 140 may include one or more server devices and/or network devices, or other types of computation or communication devices. In some implementations, WAN 140 may include an IP Multimedia Subsystem (IMS) network (not shown in FIG. 1). An IMS network may include a network for delivering IP multimedia services and may provide media flows between UE 110 and external IP networks or external circuit-switched networks (not shown in FIG. 1).

OMA DM server 150 may include one or more network devices that implement the OMA DM device management protocol for managing devices, such as for example, UEs 110. LWM2M server 160 may include one or more network devices that implement the OMA LWM2M device management protocol for managing devices. OMA DM server 150 and LWM2M server 160 may configure the devices, including UEs 110, by supplying application parameters used in the operation of the devices, may enable and disable features of the devices, and may change settings of the devices. OMA DM server 150 and LWM2M server 160 may also provide firmware and/or software upgrades to the devices, and may provide fault management of the devices (e.g., report errors from the devices, etc.). OMA DM server 150 and LWM2M server 160 may communicate with UEs 110 to update RAT and band information stored on OMA DM or LWM2M nodes of UE 110, as described in detail below.

SIM OTA server 170 may include one or more network devices that communicate with a smart card of UE 110, via access network 120 to remotely change or update data, settings, apps, functions, and/or services at UE 110. SIM OTA server 170 may communicate with a smart card of UE 110 to enable/disable bands and/or RATs of UE 110.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
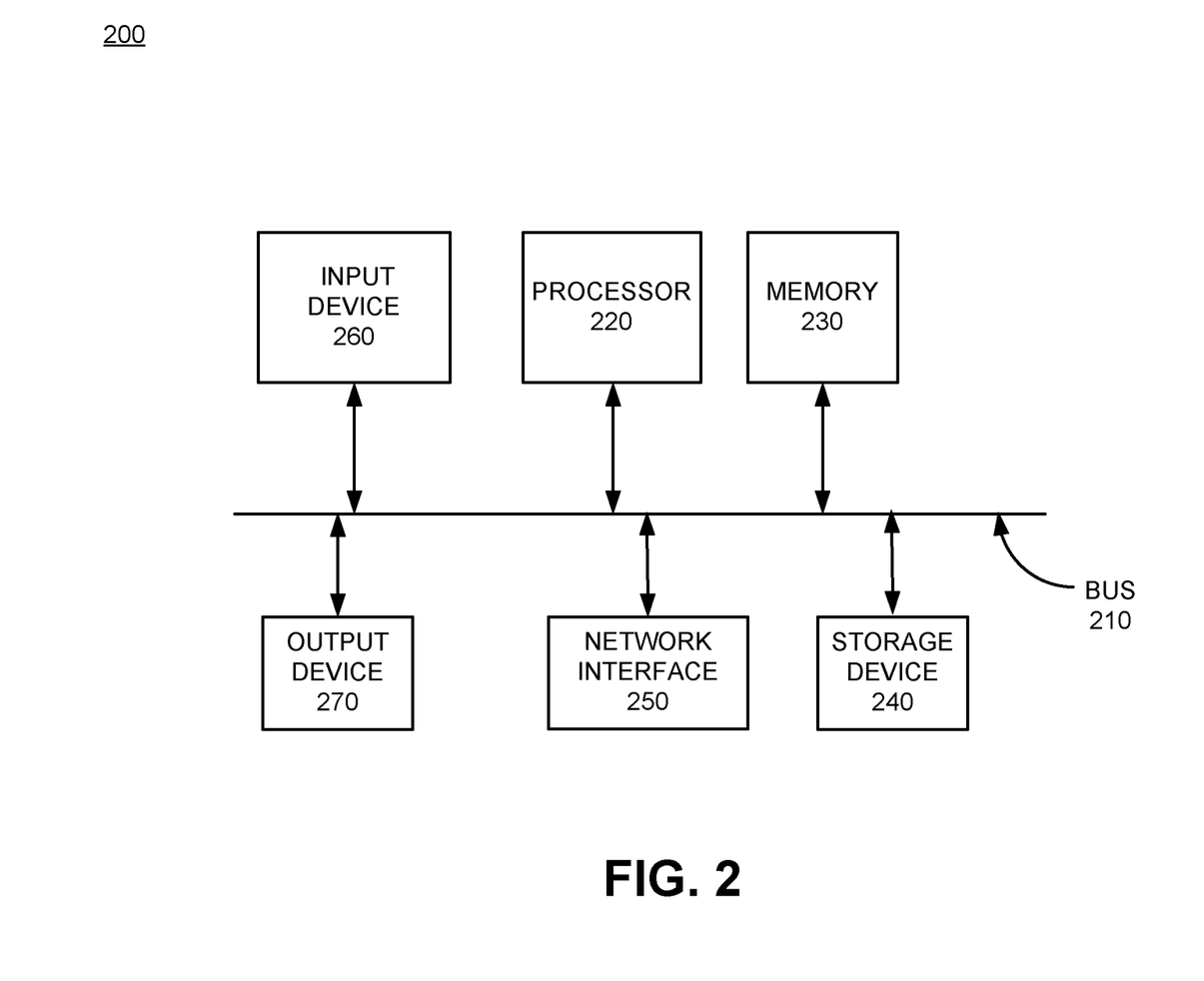
FIG. 2 is a block diagram showing exemplary components of a network device according to an embodiment.

FIG. 2 is a diagram that depicts exemplary components of a device 200. UE 110, OMA DM server 150, LWM2M server 160, and SIM OTA server 170 may each include a device similar to device 200, possibly with some variations in components and/or configuration. Device 200 may include a bus 210, a processor 220, a main memory 230, a storage device 240, a network interface 250, an input device(s) 260, and an output device(s) 270.

Bus 210 includes a path that permits communication among the components of device 200. Processor 220 may include one or more processors or microprocessors, or processing logic, which may interpret and execute instructions. Main memory 230 may include a random access memory (RAM) or another type of dynamic storage device that may store information and instructions for execution by processor 220. Storage device 240 may include a read only memory (ROM) device or another type of static storage device that stores static information and instructions for use by processor 220. Main memory 230 and storage device 240 may be a "tangible and/or non-transitory computer-readable medium."

Network interface 250 may include a transceiver that enables network device 200 to communicate with other devices and/or systems in network environment 100. Network interface 250 may be configured to exchange data with WAN 140 over wired communications (e.g., conductive wire, twisted pair cable, coaxial cable, transmission line, fiber optic cable, and/or waveguide, etc.), or a combination of wireless. In other embodiments, network interface 250 may interface with wide area network 140 using a wireless communications channel, such as, for example, radio frequency (RF), infrared, and/or visual optics, etc. Network interface 250 may include a transmitter that converts baseband signals to RF signals and/or a receiver that converts RF signals to baseband signals. Network interface 250 may be coupled to one or more antennas for transmitting and receiving RF signals. Network interface 250 may include a logical component that includes input and/or output ports, input and/or output systems, and/or other input and output components that facilitate the transmission/reception of data to/from other devices. For example, network interface 250 may include a network interface card (e.g., Ethernet card) for wired communications and/or a wireless network interface (e.g., a WiFi) card for wireless communications. Network interface 250 may also include a universal serial bus (USB) port for communications over a cable, a Bluetooth® wireless interface, an radio frequency identification device (RFID) interface, a near field communications (NFC) wireless interface, and/or any other type of interface that converts data from one form to another form.

Input device 260 may include one or more mechanisms that permit an operator to input information to device 200, such as, for example, a keypad or a keyboard, a display with a touch sensitive panel, voice recognition and/or biometric mechanisms, etc. Output device 270 may include one or more mechanisms that output information to the operator or user, including a display (e.g., with a touch sensitive panel), a speaker, etc. Input device 260 and output device 270 may be implemented as a graphical user interface (GUI) (e.g., a touch screen GUI that uses any type of touch screen device) that displays GUI information and which receives user input via the GUI.

The configuration of components of device 200 shown in FIG. 2 is for illustrative purposes. Other configurations may be implemented. Therefore, device 200 may include additional, fewer and/or different components, arranged in a different configuration, than depicted in FIG. 2. For example, UE 110 may include similar components to those shown in FIG. 2, but may omit one or more of input device(s) 260, output device(s) 270, or storage device 240.

Figure 3:
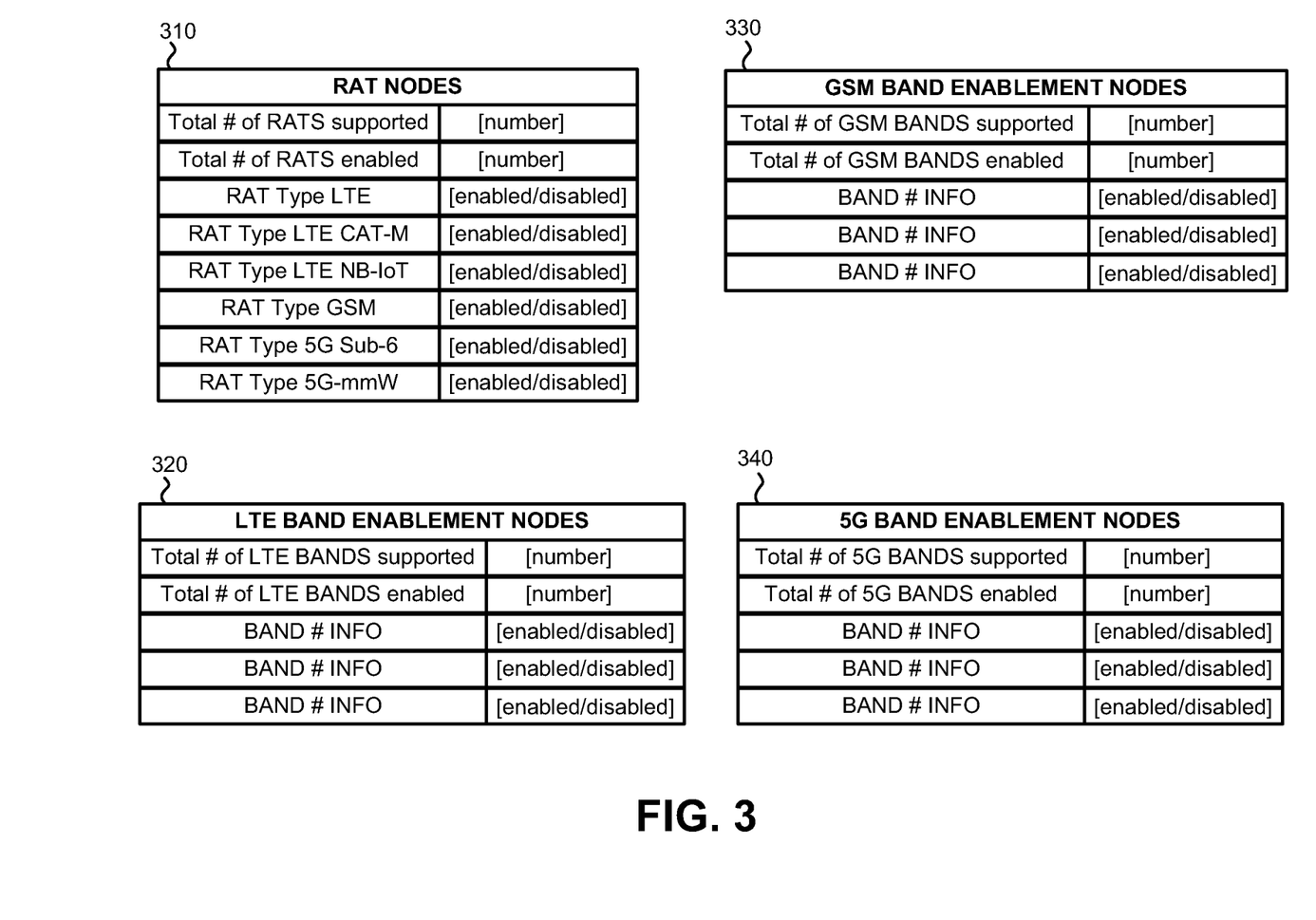
FIG. 3 is a diagram illustrating Device Management (DM) nodes according to an exemplary embodiment.

FIG. 3 illustrates exemplary DM nodes or modules (i.e., OMA DM or LWM2M nodes) supported on UE 110. The DM nodes may indicate the RATs and bands that are supported by and enabled in UE 110. When a module or device is tested by a wireless communications network, the wireless communications network may mandate support of the OMA DM or LWM2M nodes and test the nodes as part of OMA DM/LWM2M testing. When UE 110 is built with the tested module and UE 110 is launched, UE 110 may be managed using OMA DM server 150 or LWM2M server 160 (depending on the protocol supported by UE 110) by modifying attributes of the OMA DM or LWM2M nodes illustrated in FIG. 3.

As shown in FIG. 3, UE 110 may store RAT Nodes 310, LTE Band Enablement Nodes 320, GSM Band Enablement Nodes 330, and 5G Band Enablement Nodes 340. Additional or fewer OMA DM or LWM2M nodes, modules, or files may be stored on UE 110.

As shown in FIG. 3, RAT Nodes 310 may indicate the number of RATs supported by UE 110, the number of RATs enabled in UE 110, and an indication of which RATs are enabled or disabled in UE 110 in the order of RAT preference. For example, UE 110 may support three RATs (i.e., CAT-M, NB-IoT, and GSM), but only one RAT (i.e., CAT-M) may currently be enabled in UE 110. In this example, RAT Nodes 310 may indicate that the total number of RATs supported by UE=3, the total number of RATs enabled in UE=1, RAT Type LTE=enabled, RAT Type LTE CAT-M=enabled, and the other RAT Types=disabled.

Since RAT Nodes 310 list which RATs are enabled in the order of RAT preference, if more than one RAT is enabled, UE 110 may scan for the first RAT listed in RAT Nodes 310 before scanning for other RATs listed in RAT Nodes 310. If UE 110 is unable to connect via the first listed RAT, UE 110 may scan for the second listed RAT in RAT Nodes 310.

As further shown in FIG. 3, LTE Band Enablement Nodes 320 may indicate the total number of LTE bands supported by UE 110, the total number of LTE bands enabled in UE 110, and an indication of the bands that are enabled or disabled in UE 110 in the order of scanning preference. For example, UE 110 may support two LTE bands (e.g., band 13 and band 4), but only one band (e.g., band 13) may currently be enabled. In this example, LTE Band Enablement Nodes 320 may indicate that the total number of LTE bands supported by UE=2, the total number of LTE bands enabled in UE=1, band 13=enabled, and band 4=disabled.

As further shown in FIG. 3, for GSM band personalization, GSM Band Enablement Nodes 330 may be supported on UE 110. GSM Enablement Nodes 330 may indicate the total number of GSM bands supported by UE 110, the total number of GSM bands enabled in UE 110, and an indication of the bands enabled or disabled in UE 110 in order of scanning preference. Similarly, for 5G band personalization, 5G Band Enablement Nodes 340 may be supported on UE 110. 5G Band Enablement Nodes 340 may indicate the total number of 5G bands supported by UE 110, the total number of 5G bands enabled in UE 110, and an indication of the 5G bands enabled or disabled in UE 110 in order of scanning preference.

Figure 4:
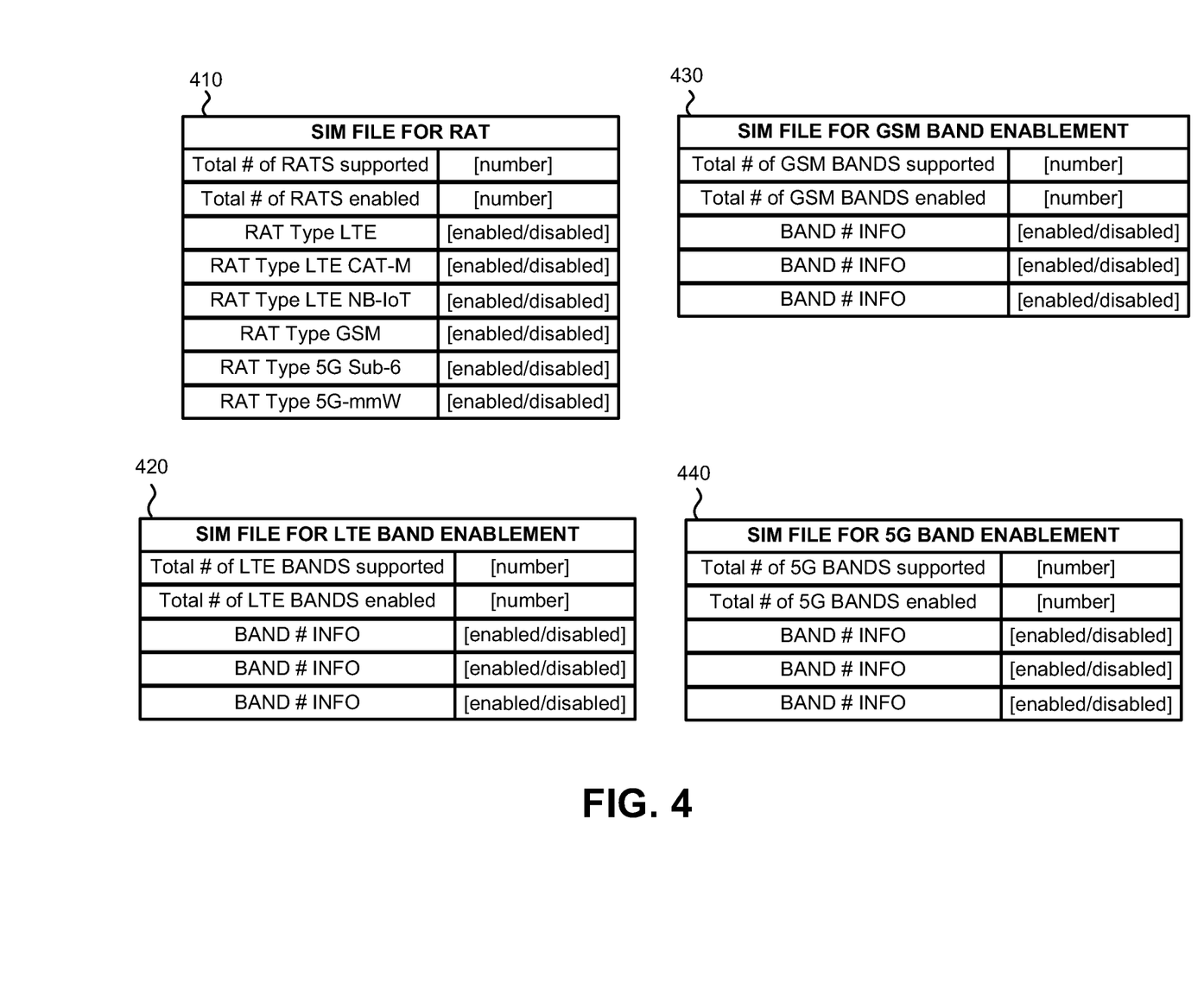
FIG. 4 is a diagram illustrating Subscriber Identity Module (SIM) files according to an exemplary embodiment.

FIG. 4 illustrates exemplary SIM files supported on the SIM card of UE 110. Upon power up, a SIM card of UE 110 may read information from UE 110 indicating which bands and RATs are supported by UE 110. The SIM card may store the band and RAT information in the SIM files illustrated in FIG. 4. The bands and RATs enabled on UE 110 may then be managed by SIM OTA server 170 by modifying the SIM files.

As shown in FIG. 4, the SIM files stored on UE 110 may include a SIM file for RAT 410, a SIM file for LTE Band Enablement 420, a SIM file for GSM Band Enablement 430, and a SIM file for 5G Band Enablement 440. Additional or fewer SIM files may be stored on the SIM card of UE 110. The SIM files illustrated in FIG. 4 may store information similar to the information stored in the OMA DM or LWM2M nodes illustrated in FIG. 3.

As shown in FIG. 4, SIM file for RAT 410 may indicate the total number of RATs supported by UE 110, the total number of RATs enabled in UE 110, and an indication of which RATs are enabled or disabled in UE 110. SIM file for RAT 410 may illustrate the RAT types in the order of RAT scanning preference. As further shown in FIG. 4, SIM file for Band Enablement 420 may indicate the total number of LTE bands supported by UE 110, the total number of LTE bands enabled in UE 110, and an indication of the bands that are enabled or disabled in UE 110 in the order of scanning preference.

As further shown in FIG. 4, for GSM band personalization, the SIM file for GSM Band Enablement 430 may be supported on UE 110. SIM file for GSM Band Enablement 430 may indicate the total number of GSM bands supported by UE 110, the total number of GSM bands enabled in UE 110, and an indication of the bands enabled or disabled in UE 110 in order of scanning preference. Similarly, for 5G band personalization, the SIM file for 5G Band Enablement 440 may be supported on UE 110. SIM file for 5G Band Enablement 440 may indicate the total number of 5G bands supported by UE 110, the total number of 5G bands enabled in UE 110, and an indication of the 5G bands enabled or disabled in UE 110 in order of scanning preference.

Figure 5:
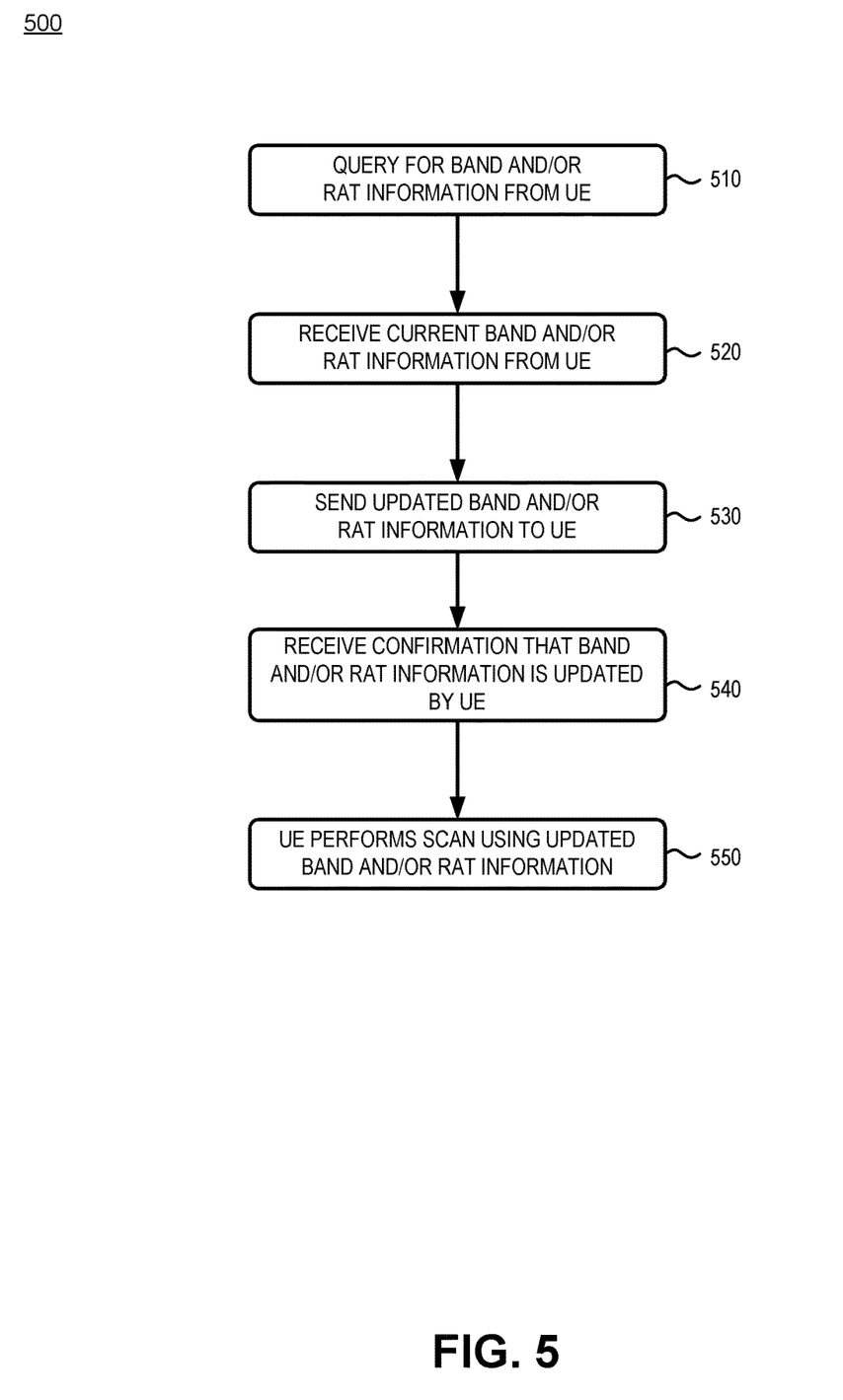
FIG. 5 is a flowchart of a process for performing dynamic band and/or RAT modification.

FIG. 5 is a flow diagram that illustrates an exemplary process 500 for enabling and/or disabling bands and/or RATs on UE 110. In one implementation, the exemplary process of FIG. 5 may be implemented by OMA DM server 150 or LWM2M server 160 by modifying DM nodes 310-340. For example, if UE 110 supports an OMA DM protocol, process 500 may be performed by OMA DM server 150. Alternatively, if UE 110 supports a LWM2M protocol, process 500 may be performed by LWM2M server 160. In another implementation, the exemplary process of FIG. 5 may be implemented by SIM OTA server 170 by modifying SIM files 410-440.

Figure 6:
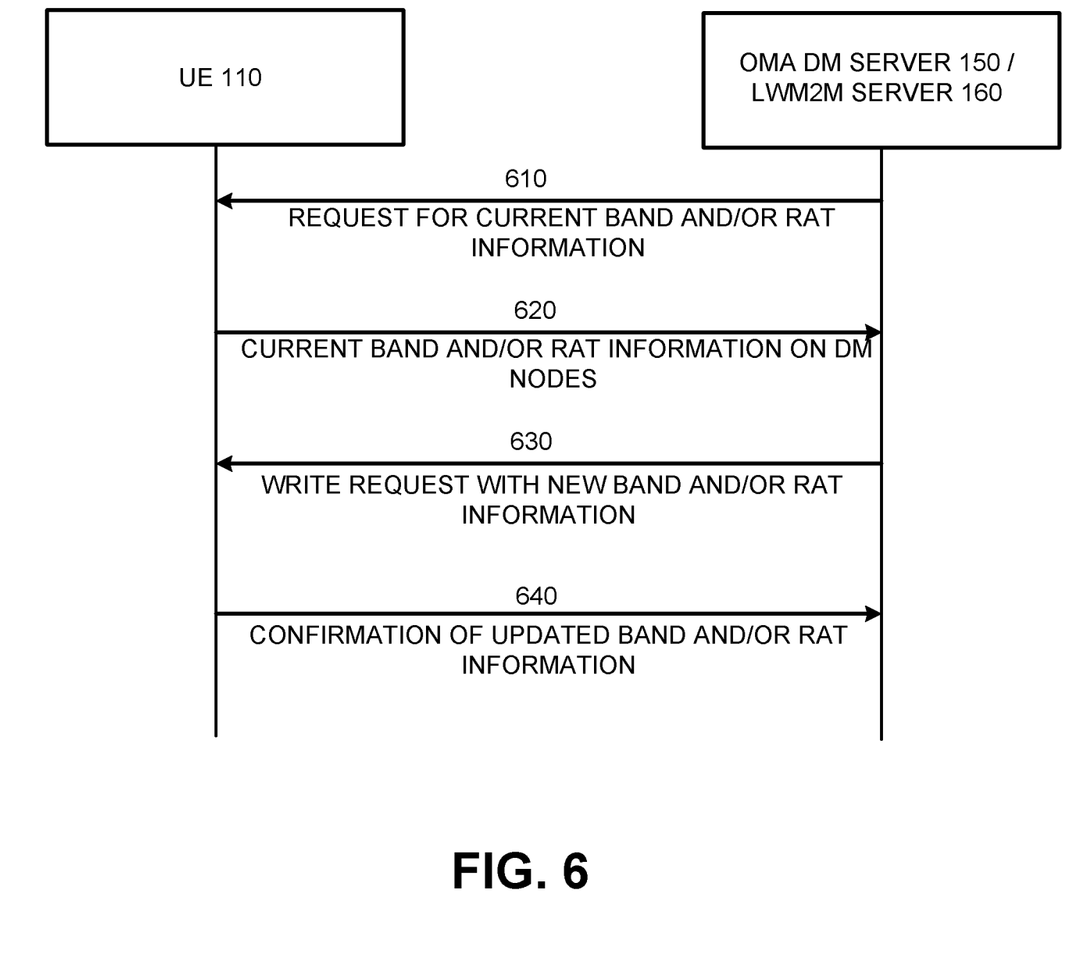
FIG. 6 is block diagram showing exemplary message flows within a networking system for performing dynamic band and/or RAT modification.
Figure 7:
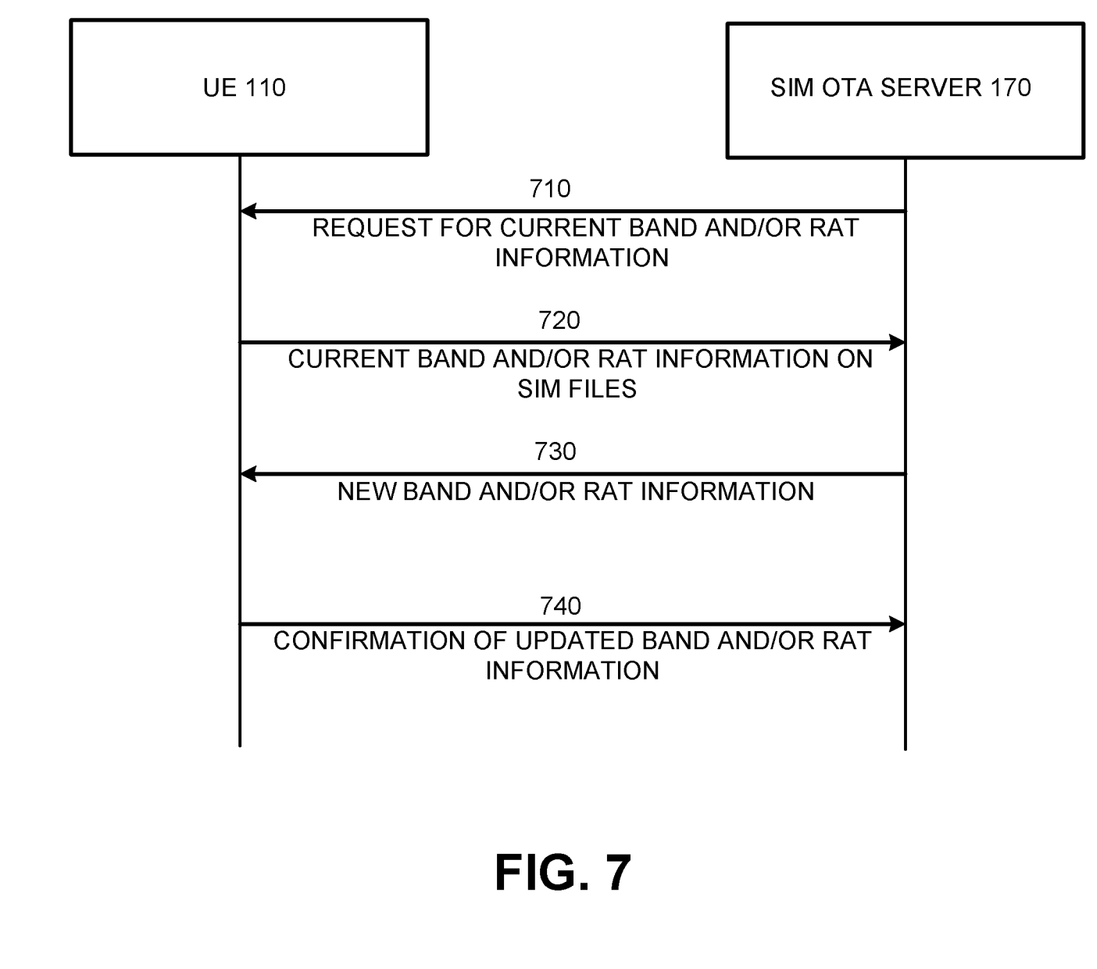
FIG. 7 is block diagram showing other exemplary message flows within a networking system for performing dynamic band and/or RAT modification.

FIG. 6 is an exemplary messaging diagram associated with the exemplary process of FIG. 5 when the exemplary process of FIG. 5 is implemented by OMA DM server 150 or LWM2M server 160. FIG. 7 is an exemplary messaging diagram associated with the exemplary process of FIG. 5 when the exemplary process of FIG. 5 is implemented by SIM OTA server 170.

Process 500 may begin by querying UE 110 for supported and enabled band and RAT information (block 510). In one implementation, the querying may be in response to a wireless communications network (e.g., access network 120 and base stations 130) supporting a new band or a new RAT. For example, when the wireless communications network supports a new band or a new RAT, the wireless communications network may query UEs 110 in order to determine current supported and enabled bands and/or RATs for UEs 110. In this way, the wireless communications network may be able to determine whether UEs 110 have the capability to communicate using the new band or the new RAT by enabling the new band or the new RAT.

In another implementation, the querying may be in response to a customer requesting an update of UE 110 via an IoT platform that allows customers to manage devices associated with the wireless communications network. For example, customers may upgrade firmware, perform FOTA updates, troubleshoot, monitor diagnostics, debug devices, change DM nodes, and perform additional actions using the IoT platform. In one implementation, a customer may request that particular RATs and/or bands be enabled and/or disabled via the IoT platform. In this implementation, the wireless communications network may review customer requests and query UEs 110 based on the customer requests.

In one implementation, as shown in FIG. 6, the querying may be performed when OMA DM server 150/LWM2M server 160 sends a message to UE 110 requesting information indicating the bands and/or RATs supported by and enabled in UE 110 (610). Information identifying the supported and enabled bands and/or RATs may be stored on DM nodes 310-340 on UE 110.

Turning to FIG. 7, in another implementation, the querying discussed with respect to block 510 may be performed when SIM OTA server 170 sends UE 110 a message requesting the band and RAT information stored on SIM files 410-440 of the SIM card of UE 110 (710).

Returning to FIG. 5, process 500 may continue by receiving supported and enabled band and/or RAT information from UE 110 (block 520). In one implementation, as shown in FIG. 6, OMA DM server 150/LWM2M server 160 may receive information identifying the supported and enabled bands and/or RAT information stored on nodes 310-340 on UE 110 (620). In another implementation, as shown in FIG. 7, SIM OTA server 170 may receive, from UE 110, the band and RAT information stored on SIM files 410-440 of the SIM card of UE 110 (720).

Process 500 may continue by sending updated band and/or RAT information to UE 110 (block 530). In one implementation, as shown in FIG. 6, OMA DM server 150/LWM2M server 160 may send a write request to UE 110 including new band and/or RAT information (630). For example, OMA DM server 150/LWM2M server 160 may send a write request to UE 110 with updated information for modifying nodes 310-340. For example, if a wireless communications network switches from LTE to 5G communications, OMA DM server 150/LWM2M server 160 may send a write request to UE 110 to modify RAT Nodes 310 to disable RAT Type LTE and enable RAT Type 5G. As another example, if the wireless communications network enables a new band (i.e., band 4), OMA DM server 150/ LWM2M server 160 may send a write request to UE 110 to enable band 4 on LTE Band Enablement Nodes 320.

In another implementation, as shown in FIG. 7, SIM OTA server 170 may send updated band and RAT information to UE 110 to update SIM files 410-440 (730). In one example, SIM OTA server 170 may send UE 110 updated information indicating that RAT Type LTE should be disabled and RAT Type 5G should be enabled in SIM file for RAT 410. As another example, SIM OTA server 170 may send UE 110 updated information indicating that band 4 should be enabled in SIM file for LTE Band Enablement 420.

Process 500 may continue by receiving a confirmation from UE 110 that the band and/or RAT information has been updated (block 540). In one implementation, as shown in FIG. 6, OMA DM server 150/LWM2M server 160 may receive an indication from UE 110 that nodes 310-340 have been updated with the new band and RAT information (640). In another implementation, as shown in FIG. 7, SIM OTA server 170 may receive an indication from UE 110 that the band and RAT information has been updated in SIM files 410-440 (740).

When the band and/or RAT information has been updated, UE 110 may perform a scan using the updated band and RAT information (block 550). In one implementation, once the new band and/or RAT information is updated on UE 110, UE 110 may automatically scan per the updated RAT and/or band information. For example, if the RAT information has been updated to disable type LTE and enable type 5G, UE 110 may begin scanning for 5G bands. As another example, if the band information has been updated to enable band 4, UE 110 may begin scanning for band 4 on the wireless communications network.

The process as described with regard to FIGS. 5-7 may be performed for all UEs 110 or for particular types of UEs 110 (e.g., smartphones, M2M devices, 5G devices, etc.). In addition, process 500 may be enabled for all or only particular types of 5G/LTE category devices (e.g., 5G, CAT-1, CAT-M1, CAT-NB1, etc.).

In certain circumstances, process 500 may be implemented using the IoT platform associated with a wireless communications network that allows customers to manage devices. In this implementation, the wireless communications network may review customer requests and enable and/or disable RATs and/or bands on UEs 110 based on the customer requests.

Process 500 may be implemented for managing which RATs are prioritized during scanning using DM nodes 310-340 or SIM files 410-440. For example, DM node 310 and SIM file 410 may list RATs in order of scanning preference. Therefore, if more than one RAT is enabled for UE 110, UE 110 may scan for RATs in an order indicated in DM node 310 or SIM file 410. In addition, process 500 may implemented for managing which bands are prioritized during scanning using DM nodes 310-340 and/or SIM files 410-440. For example, DM nodes 320-340 or SIM files 420-440 may list bands to scan in order of preference. Therefore, if more than one band is enabled in DM nodes 320-340 or SIM files 420-440, UE 110 may scan for bands in the order indicated in DM nodes 320-340 or SIM files 420-440.

In addition, based on a location of UE 110, certain RATs or bands may be enabled or disabled using the process described with respect to FIGS. 5-7. For example, if UE 110 is roaming, process 500 may be implemented to disable a RAT (e.g., CAT-M, NB-IoT, etc.) and enable a different RAT (e.g., GSM, etc.) or to enable/disable a particular band.

In one implementation, artificial intelligence (AI) and/or machine learning (ML) algorithms may be implemented in OMA DM server 150/LWM2M server 160, SIM OTA server 170, and/or the IoT platform using process 500. For example, AI and/or ML algorithms may be implemented to trigger band and/or RAT updates when certain events (e.g., congestion, change of geo-location, roaming, etc.) occur. In this way, OMA DM server 150/LWM2M server 160 and/or SIM OTA server 170 may be able to dynamically enable and/or disable particular RATs and/or bands in UE 110 to scan for a new RAT and/or band in order to provide a higher level of quality of experience when the events occur.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 5, and a series of signal flows/messages have been described with respect to FIGS. 6 and 7, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    sending, by a device and to a user device, a first message requesting information identifying a radio access technology (RAT) or band supported by the user device and a RAT or band enabled on the user device;
    receiving, at the device and from the user device, an indication of the RAT or band supported by the user device and the RAT or band enabled on the user device;
    sending, by the device and to the user device, a second message instructing the user device to modify the RAT or band enabled on the user device, wherein the second message includes an indication of updated RAT or band information to be used by the user device for future scans associated with the user device attempting to connect to a network; and
    receiving, by the device and from the user device, a confirmation that the RAT or band enabled on the user device has been modified based on the updated RAT or band information.

2. The method of claim 1, wherein the information identifying the RAT or band supported by the user device and the RAT or band enabled on the user device is stored on a device management (DM) node on the user device.

3. The method of claim 2, wherein the device comprises an Open Mobile Alliance (OMA) DM server and wherein the DM node includes OMA DM nodes.

4. The method of claim 2, wherein the device includes a Lightweight Machine-to-Machine (LWM2M) server and the DM node includes LWM2M nodes.

5. The method of claim 1, wherein the information identifying the RAT or band supported by the user device and the RAT or band enabled on the user device is stored on a subscriber identity module (SIM) file of a SIM card of the user device and wherein the device includes a SIM over-the-air (OTA) server.

6. The method of claim 1, wherein the second message includes an indication of a first RAT or band to disable on the user device and an indication of a second RAT or band to enable on the user device for future scans, the method further comprising:
    performing, by the device, an audit to determine whether each of a plurality of user devices is operating in accordance with an approved RAT and band.

7. The method of claim 6, wherein receiving the indication of the RAT or band supported by the user device includes receiving an indication that the second RAT or band is supported by the user device.

8. A device comprising:
    a processor configured to execute instructions to:
        send, to a user device, a first message requesting information identifying a radio access technology (RAT) or band supported by the user device and a RAT or band enabled on the user device;
        receive, from the user device, an indication of the RAT or band supported by the user device and the RAT or band enabled on the user device;
        send, to the user device, a second message instructing the user device to modify the RAT or band enabled on the user device, wherein the second message includes an indication of updated RAT or band information to be used by the user device for future scans associated with the user device attempting to connect to a network; and
        receive, from the user device, a confirmation that the RAT or band enabled on the user device has been modified based on the updated RAT or band information.

9. The device of claim 8, wherein the information identifying the RAT or band supported by the user device and the RAT or band enabled on the user device is stored on device management (DM) nodes on the user device.

10. The device of claim 9, wherein the device includes an Open Mobile Alliance (OMA) DM server and wherein the DM nodes include OMA DM nodes.

11. The device of claim 9, wherein the device includes a Lightweight Machine-to-Machine (LWM2M) server and wherein the DM nodes include LWM2M nodes.

12. The device of claim 8, wherein the information identifying the RAT or band supported by the user device and the RAT or band enabled on the user device is stored on a subscriber identity module (SIM) file of a SIM card of the user device and wherein the device includes a SIM over-the-air (OTA) server.

13. The device of claim 8, wherein the second message includes an indication of a first RAT or band to disable on the user device and an indication of a second RAT or band to enable on the user device for future scans, wherein the processor is further configured to:
    perform an audit to determine whether each of a plurality of user devices is operating in accordance with an approved RAT and band.

14. The device of claim 13, wherein, when receiving the indication of the RAT or band supported by the user device, the processor is further configured to receive an indication that the second RAT or band is supported by the user device.

15. A non-transitory computer-readable medium storing instructions, the instructions comprising:
    one or more instructions that, when executed by one or more processors of a user device, cause the one or more processors to:
        receive, from a device, a first message requesting information identifying a radio access technology (RAT) or band supported by the user device and a RAT or band enabled on the user device;
        send, to the device, an indication of the RAT or band supported by the user device and the RAT or band enabled on the user device;

receive, from the device, a second message to modify the RAT or band enabled on the user device, wherein the second message includes an indication of updated RAT or band information to be used by the user device for future scans associated with the user device attempting to connect to a network;

send, to the device, a confirmation that the RAT or band enabled on the user device has been modified; and perform a RAT scan or a band scan using the updated RAT or band information.

16. The non-transitory computer-readable medium of claim 15, wherein the information identifying the RAT or band supported by the user device and the RAT or band enabled on the user device is stored on device management (DM) nodes on the user device.

17. The non-transitory computer-readable medium of claim 16, wherein the device includes an Open Mobile Alliance (OMA) DM server and wherein the DM nodes include OMA DM nodes.

18. The non-transitory computer-readable medium of claim 16, wherein the device includes a Lightweight Machine-to-Machine (LWM2M) server and wherein the DM nodes include LWM2M nodes.

19. The non-transitory computer-readable medium of claim 15, wherein the information identifying the RAT or band supported by the user device and the RAT or band enabled on the user device is stored on a subscriber identity module (SIM) file of a SIM card of the user device and wherein the device includes a SIM over-the-air (OTA) server.

20. The non-transitory computer-readable medium of claim 15, wherein the second message includes an indication of a first RAT or band to disable on the user device and an indication of a second RAT or band to enable on the user device for future scans, and wherein the second RAT or band is supported by the user device.

* * * * *